US012323563B2

(12) United States Patent
Yamada (10) Patent No.: US 12,323,563 B2
(45) Date of Patent: Jun. 3, 2025

(54) SIGNATURE SYSTEM, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Jun Yamada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 380 days.

(21) Appl. No.: 17/935,105

(22) Filed: Sep. 25, 2022

(65) Prior Publication Data

US 2023/0096499 A1 Mar. 30, 2023

(30) Foreign Application Priority Data

Sep. 29, 2021 (JP) .................................. 2021-159234

(51) Int. Cl.
*G06Q 10/00* (2023.01)
*G06Q 30/018* (2023.01)
*G06V 40/30* (2022.01)
*H04N 1/00* (2006.01)
*H04N 1/32* (2006.01)

(52) U.S. Cl.
CPC ....... *H04N 1/00941* (2013.01); *G06Q 30/018* (2013.01); *G06V 40/30* (2022.01); *H04N 1/32144* (2013.01)

(58) Field of Classification Search
CPC .......... H04N 1/00941; H04N 1/32144; G06Q 30/018; G06Q 20/102; G06Q 20/326; G06Q 20/3825; G06Q 20/4014; G06V 40/30; H04L 63/10; H04L 63/12; H04W 12/77; H04W 12/084; H04W 12/108; G06F 21/608

See application file for complete search history.

(56) References Cited

U.S. PATENT DOCUMENTS 11,829,427 B1 * 11/2023 Parampottil .......... G06F 16/953
2006/0000904 A1 * 1/2006 Vernay .................. H04L 9/3263
705/12

(Continued)

FOREIGN PATENT DOCUMENTS

JP 2005-352863 A 12/2005

OTHER PUBLICATIONS

Bump, Pamela. ("What are Mini Apps & Why Marketers Should Care". HubSpot. Sep. 22, 2020. Retrieved at https://blog.hubspot.com/marketing/mini-apps.) (Year: 2020).*

(Continued)

*Primary Examiner* — Gabrielle A McCormick
(74) *Attorney, Agent, or Firm* — KENEALY VAIDYA LLP (57) ABSTRACT

A signature system includes an applicant side device and an approver side device. A full-application is installed in the applicant side device, an applicant generate, using the full-application, an expense report in which a signature field and a mark for starting up a mini application is included and print the same using a printer. An approver receives the printed expense report read the mark included in the expense report using the approver side device, thereby downloads the mini application from a server and starts up the same. Then, the approver approves the expense report on the mini application.

12 Claims, 8 Drawing Sheets

(56) References Cited

U.S. PATENT DOCUMENTS

| | | | | |
|---|---|---|---|---|
| 2014/0098398 | A1* | 4/2014 | Hobbs | G06F 3/1244 358/1.15 |
| 2015/0073823 | A1* | 3/2015 | Ladd | G06F 16/9535 705/2 |
| 2017/0185798 | A1* | 6/2017 | Qian | G06F 16/2358 |
| 2020/0242712 | A1* | 7/2020 | Lu | G06Q 50/18 |

OTHER PUBLICATIONS

Steiner, Thomas. ("What are mini apps?". Web.dev. Mar. 3, 2021. Retrieved at: https://web.dev/articles/mini-apps/mini-app-about) ( Year: 2021).*

* cited by examiner

| | | | | | | | | |
|---|---|---|---|---|---|---|---|---|
| EXPENSE REPORT | | | | | | | | |
| EMPLOYEE INFORMATION | | | | STATEMENT NUMBER: 2021-XXX-XXX | | | | |
| NAME HOTA XX | | | DEPARTMENT DEVELOPMENT DIVISION XXG | | | | | |
| EMPLOYEE ID 100000 | | | MANAGER MIZUHO XX | | PAYMENT PERIOD | | | |
| POSITION CHIEF | | | | | START 8/31/2021 | | | |
| | | | | | END 8/31/2021 | | | |

| DATE | PURPOSE | REMARKS | HOTEL | TRANSPORTATION EXPENSES | FUEL | MEALS | TELEPHONE | RECREATION | OTHER | TOTAL |
|---|---|---|---|---|---|---|---|---|---|---|
| 2021/8/31 | BUSINESS TRIP | FOR ATTENDING MEETING TOKYO AA HOTEL | | 21,600 JPY | | | | | | 21,600 JPY |
| | | | - JPY | 21,600 JPY | - JPY | - JPY | - JPY | - JPY | - JPY | |

SUB TOTAL 21,600 JPY
ADVANCE
TOTAL 21,600 JPY

| FIRST APPROVER HOTTA XX | FIRST APPROVER MIZUHO XX | SECOND APPROVER ARATAMA XX |
|---|---|---|
| | | |

MINI APP

SIGNATURE SYSTEM, AND NON-TRANSITORY COMPUTER-READABLE RECORDING MEDIUM THEREFOR

REFERENCE TO RELATED APPLICATIONS

This application claims priority from Japanese Patent Application No. 2021-159234 filed on Sep. 29, 2021. The entire content of the priority application is incorporated herein by reference.

BACKGROUND ART

The present disclosures relate to a signature system regarding a signature to a document and a non-transitory computer-readable recording medium for such a signature system.

Conventionally, there is known technology for electronically applying a digital signature onto a document instead of sealing (stamping) or signing on paper documents. For example, as a conventional technology, a system for electronically sealing a digital document and exchanging the sealed digital document among multiple persons is known. In such a conventional system, image information of a seal imprint (seal image) is stored in advance in a server, and when a digital document is displayed with a seal image added, the image information of the seal image is downloaded from the server and added to a specified position in the digital document.

DESCRIPTION

When digital documents requiring signatures are exchanged between multiple persons, they may include signers who are unable to perform a signature flow, which is a series of procedures for electronic signatures. For example, when documents to be signed are exchanged between different companies or organizations, signers who have not installed programs to support the signature flow, or whose installation is restricted, may be included. In such a case, the user would have to give up the signature flow using that program, print the digital document on paper, have the paper signed, and then digitize the document again after signing.

The present disclosures disclose a technology to improve the signature flow when digital documents requiring signatures are exchanged between multiple persons.

According to aspects of the present disclosure, there is provided a signature system having a first device and a second device. The first device is a device for an applicant, and the second device is a device for an approver. The first device includes a first non-transitory computer-readable storage containing first computer-executable instructions realizing a full-application executable by a computer of the first device. The full-application corresponds to a signature flow. The second device does not have the full-application installed. When the first device receives a print instruction to print a digital document subject to signature, the full-application cause, when executed by the computer of the first device, a printer to print the digital document, a signature field, and a mark for starting up a mini application. Identification information of the digital document is printed on the printed digital document. Information of a signer is printed on the printed signature field. The mini application is a program realized by second computer-executable instructions. The mini application is a program having part of functions of the full-application. The mini application is executable after downloaded without installation. The mini application is deleted when a particular time period has elapsed after downloaded. The mark for starting the mini application including access information necessary for download of the mini application. The full-application causes, when executed by the computer of the first device, the first device to upload electronic data corresponding to the digital document to a server to store the digital document therein in response to receipt of the print instruction, the electronic data to be stored in the server containing identification information of the digital document and signature information including a signer of the digital document and a signature status. The second device is configured to read the mark printed by the first device, download the mini application using the access information contained in the mark, and execute the downloaded mini application. The mini application causes, when executed by a computer of the second device, the second device to perform identifying a user of the second device, reading the digital document printed by the first device to identify the identification information of the digital document, reading the signature field printed by the first device to identify the signer for the digital document, determining whether approval of the identified user of the second device is necessary based on the identified signer of the digital document and based on the electronic signature information included in the electronic data corresponding to the identified identification information of the digital document among the electronic data stored in the server, requesting for a signature of the user of the second device when determining that the approval of the identified user of the second device is necessary, and accessing the server when a digital signature of the user of the second device has been made, updating the signature information contained in the electronic data corresponding to the identified identification information of the digital document.

According to aspects of the present disclosure, there is provided a non-transitory computer-readable recording medium containing computer-executable instructions realizing an applicant side program executable by a computer of a first device. The applicant side program corresponds to a signature flow. The applicant side program causes, when executed by the computer, the first device to perform receiving a print instruction to print a digital document subject to signature, causing a printer to perform printing of the digital document, a signature field, and a mark for starting up a mini application when receiving the print instruction, identification information of the digital document being printed on the printed digital document, information of a signer being printed on the printed signature field, the mini application being a program realized by second computer-executable instructions, the mini application being a program having part of functions of the applicant side program, the mini application being executable after downloaded without installation, the mini application being deleted when a particular time period has elapsed after downloaded, the mark for starting the mini application including access information necessary for download of the mini application, the mini application identifying a user of the second device, identifying identification information of the digital document printed by the first device by reading the digital document printed by the first device, and identifying a signer of the digital document by reading the signature field printed by the first device when the mini application is downloaded by the second device based on the access information included in the mark. The applicant side program causes, when executed by the computer of the first device, the first device to upload electronic data corresponding to the digital document to a server to store the digital document therein in response to receipt of the print instruction, the electronic data to be stored in the server containing identification information of the digital document and signature information including a signer of the digital document and a signature status, the mini application determining whether approval of the identified user of the second device is necessary based on the identified signer of the digital document and based on the electronic signature information included in the electronic data corresponding to the identification information of the digital document among the electronic data stored in the server, requesting for a signature of the user of the second device when determining that the approval of the user of the second device is necessary, and accessing the server when a digital signature of the user of the second device has been made, updating the signature information contained in the electronic data corresponding to the identified identification information of the digital document.

According to aspects of the present disclosure, there is provided a non-transitory computer-readable recording medium containing computer-executable instructions realizing an approver side program executable by a computer of a device. The approver side program realizes part of functions of a full-application. The approver side program is executable after downloaded without installation. The approver side program is deleted when a particular time period has elapsed after downloaded. The full-application is a program corresponding to a signature flow. The full-application is a program different from the approver side program. The approver side program causes, when executed by the computer of the device, the device to perform identifying a user of the device, reading the digital document printed by the full-application to identify the identification information of the digital document, when receiving a print instruction to print the digital document subject to signature, the full-application causing a printer to print the digital document, a signature field, and a mark for starting up the approver side program, identification information of the digital document being printed on the printed digital document, information of a signer being printed on the printed signature field, the full-application uploading electronic data corresponding to the digital document to a server to store therein in response to receipt of the print instruction, the electronic data to be stored in the server containing identification information of the digital document and signature information including a signer of the digital document and a signature status. The approver side program further causes, when executed by the computer of the device, the device to perform reading the signature field printed by the full-application to identify the signer for the digital document, determining whether approval of the identified user of the device is necessary based on the identified signer of the digital document and based on the electronic signature information included in the electronic data corresponding to the identified identification information of the digital document among the electronic data stored in the server, requesting for a signature of the user of the device when determining that the approval of the identified user of the device is necessary, and accessing the server when a digital signature of the user of the device has been made, updating the signature information contained in the electronic data corresponding to the identified identification information of the digital document.

Hereinafter, referring to the accompanying drawings, a signature system 1 according to an embodiment of the present disclosures will be described.

Figure 1:
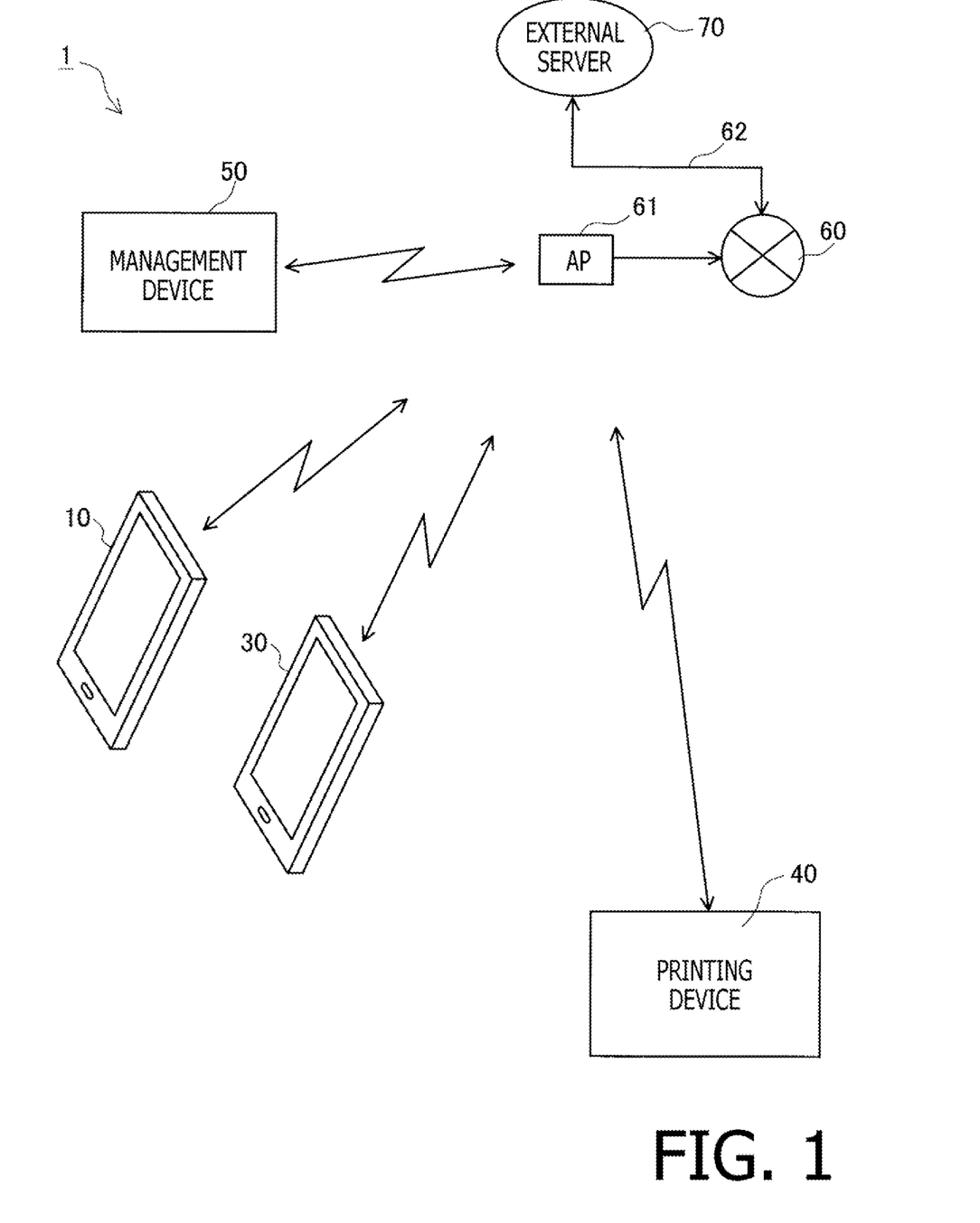
FIG. 1 schematically shows a configuration of a signature system according to an embodiment.

FIG. 1 schematically shows a configuration of the signature system 1 according to the embodiment. The signature system 1 includes an applicant's device 10, an approver's device 30, a printing device 40 and a management device 50. The applicant's device 10 and the approver's device 30 are configured by a smartphone. The applicant's device 10 and the approver's device 30 may be configured by, for example, a tablet computer or a desktop computer, instead of the smartphone. In accordance with the number of approvers, multiple approvers' devices may be included in the signature system 1.

The applicant's device 10, the approver's device 30, the printing device 40, and the management device 50 are configured to communicate with each other via an access point 61 of a local area network (LAN) 60. The LAN 60 is connected to an external server 70 via an Internet 62. In FIG. 1, the Internet and an Internet line as collectively described as an arrow 62. It is noted that, regarding the access point 61 of the LAN 60, a plurality of the same may be provided as necessary. Further, the management device 50 may be connected to the access point 61 via the Internet 62. When at least one of the approvers belongs to another organization, e.g., another company, the approver's device 30 for that approver may be configured to connect to the LAN 60 via that company's LAN access point (not shown) and the Internet 62.

As will be described later, the applicant's device 10, the approver's device 30, the printing device 40 and the management device 50 may be configured to communicate directly with each other without the need for the access point 61 of the LAN 60. The communication method is not necessarily limited to the wireless method, but a wired method may be employed. It is noted that the applicant's device 10 is an example of a first device, the approver's device 30 is an example of a second device, and the printing device 40 is an example of a printer.

Figure 2:
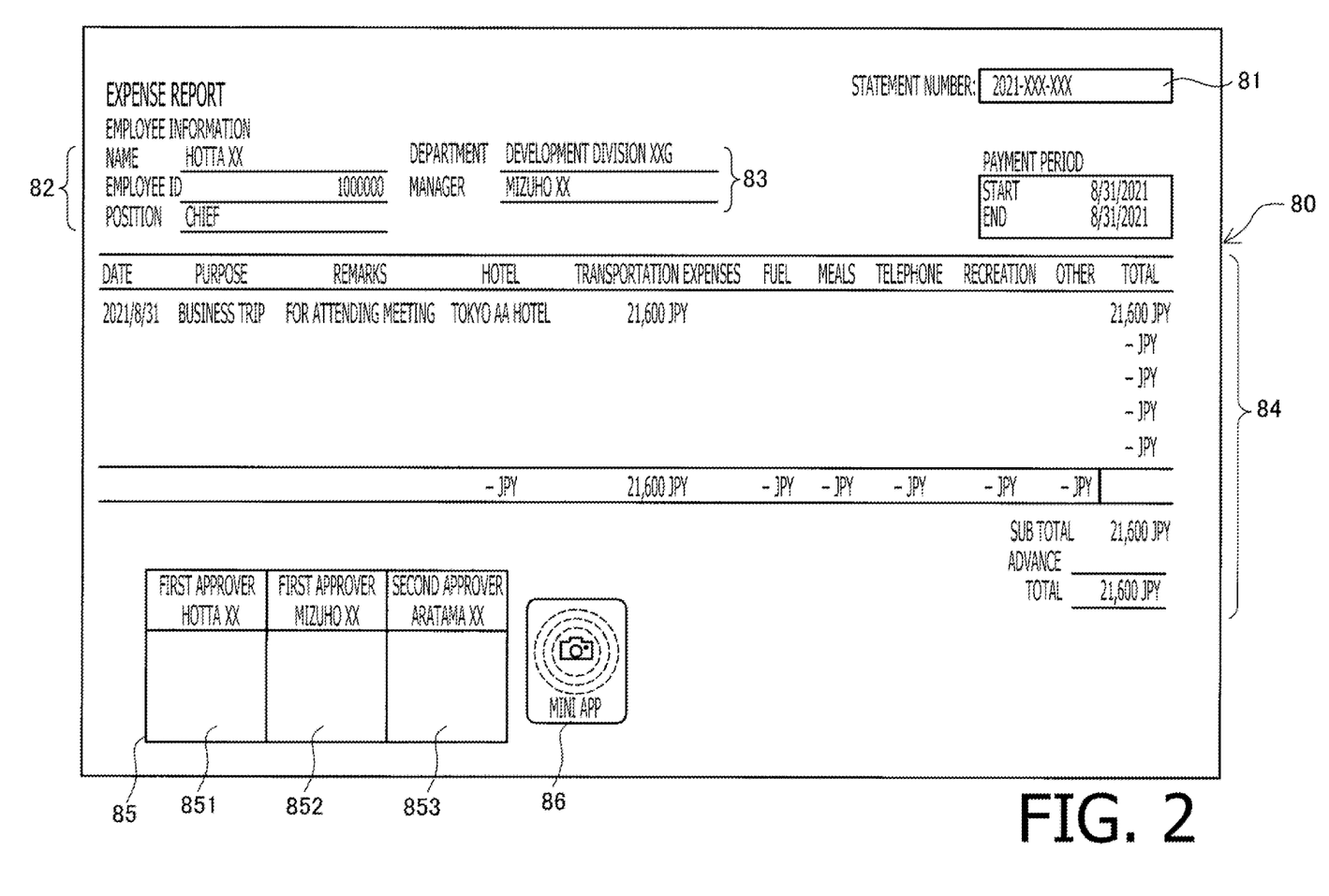
FIG. 2 schematically shows an example of an expense report.

According to the signature system 1 of the present embodiment, for example, regarding the approval of expense report 80 as shown in FIG. 2, it is possible to perform a series of approval procedures without questioning the approver's signature method, such as an electronic signature or a seal on a paper document. Procedures to which the signature system 1 according to the present embodiment is applied is not necessarily limited to the approval procedures for expense reports 80, but can be applied to any approval procedures, for example, for contracts related to the purchase of goods and joint development.

The expense report 80 includes a number field 81, an applicant information field 82, a department information field 83, an expense statement field 84, a signature and seal field 85, and a field 86 for a QR code (registered trademark of Denso Wave Incorporated) are provided. The signature and seal filed 85 is provided with an applicant's signature field 851, a primary approver's signature field 852 and a secondary approver's signature field 853. It is noted that the expense report 80 is an example of a digital document, the signature and seal field 85 is an example of a signature field, and the QR code is an example of a mark.

In the number field 81, a statement number assigned to each expense report 80 to identify the same is indicated. It is noted that the statement number is an example of identification information. In the applicant information field 82, the applicant information of an applicant who applies for expense report 80 is indicated. In the department information field 83, department information to which the applicant belongs is indicated. In the expense statement field 84, expenses necessary for the application are indicated. In an applicant signature field 851 of the signature and seal field 85, a name of the applicant and an electronic signature of the applicant are indicated. In the primary approver signature and seal field 852, the name of the primary approver is indicated, and a seal or an electrical signature of the first approver is also indicated. In the secondary approver signature and seal field 853, the name of the secondary approver is indicated, and a seal or an electrical signature of the second approver is also indicated. The QR code 86 stores activation information for an approval mini application (approval mini-app) 31, which will be described below. The activation information includes access information of the download source (e.g., a URL) of the approval mini application 31.

Figure 3:
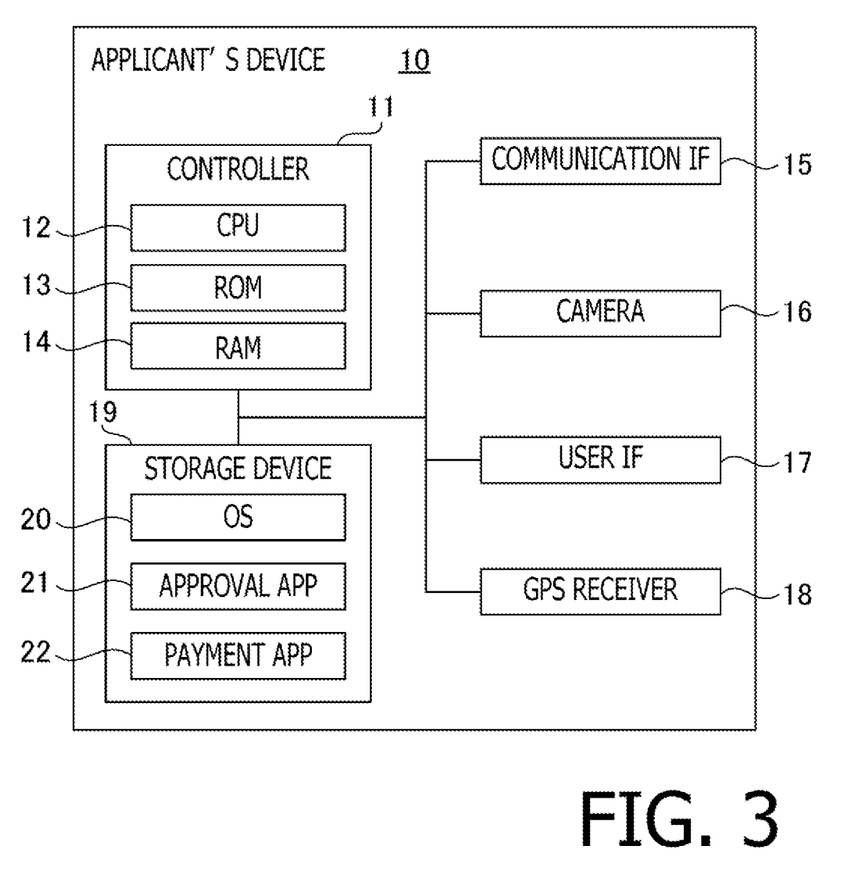
FIG. 3 is a block diagram showing a configuration of an applicant's device.

FIG. 3 is a block diagram showing a schematic configuration of the applicant's device. As shown in FIG. 3, the applicant's device 10 has a controller 11. The controller 11 is configured to perform a main control of the applicant's device 10. The controller 11 has a CPU 12, a ROM 13, and a RAM 14. The CPU 12 is a central processing unit configured to execute various control programs. The CPU 12 is an example of a computer. The ROM 13 is configured to store various programs to be executed by the CPU 12 and data to be stored permanently. The RAM 14 is configured to temporarily store results of operations which are performed as the CPU 12 executes various programs. It is noted that the controller 11 in FIG. 3 is a collective name including hardware and software used for controlling the applicant's device 10, and is not intended to indicate a single piece of hardware existing in the applicant's device 10.

The applicant's device 10 includes a communication interface (hereinafter referred to as a "communication IF") 15, a camera 16, a user interface (hereinafter referred to as a "user IF") 17, a GPS receiver 18, and the like.

The communication IF 15 includes hardware for communication with devices such as the printing device 40 and the management device 50 via the access point 61 of the LAN 60. The communication method of the communication IF 15 may be wireless or wired IF. Further, the communication method of the communication IF 15 may be of any standards such as the Wi-Fi (registered trademark of Wi-Fi Alliance), LAN and the like. Furthermore, the communication method of the communication IF 15 may have functions, such as Bluetooth (registered trademark of Bluetooth SIG) or USB, to directly connect to the devices such as the printing device 40 or the management device 50 without the need for the access point 61.

The camera 16 is connected to the controller 11 and is configured to capture any object. The camera 16 may include hardware that provides imaging function and may be incorporated into a body of the applicant's device 10, or the camera 16 may be a separate unit that can be connected to the applicant's device 10.

The user IF 17 is configured with a touchscreen panel having both display and operation reception functions, and is connected to the controller 11. It is noted that the user IF 17 is an example of a display, and an example of an input interface. It is also noted that the user IF 17 may include a combination of a display such as an LCD or organic EL display for displaying information, and a keyboard and a mouse for receiving user inputs.

The GPS receiver 18 is configured to receive signals from satellites and provide functions such as a function of detecting the current position of the applicant's device 10 and a function of obtaining accurate time information. The GPS is an abbreviation of Global Positioning System.

The applicant's device 10 has a storage device 19. As the storage device 19, a semiconductor memory such as a flash memory or an HDD (Hard Disk Drive) can be used. In the storage device 19, an operating system (hereinafter referred to as an "OS") 20, an authorization application program (hereinafter referred to as an "authorization app") 21, a payment application program (hereinafter referred to as a "payment app") 22, and the like are stored.

The OS 20 is the iOS (registered trademark of Apple Inc.). Alternatively, the OS 20 may be any of Windows (registered trademark of Microsoft Corporation), macOS (registered trademark of Apple Inc.), Linux (registered trademark of Linux Mark Institute), and Android (registered trademark of Google LLC).

The approval app 21 becomes available for use, for example, when downloaded from the external server 70 via an Internet line and installed. It is noted that the approval app 21 may be downloaded from the management device 50 instead of the external server 70.

The approval app (approval app) 21 is a program that enables the applicant to generate various approval forms via the user IF 17, concretely, for example, the expense report 80. In other words, the approval app 21 causes, when execute by the CPU 12, the applicant's device 10 to perform receiving instructions from the applicant to generate, edit, print the expense report 80 and, based on the received instructions, the CPU 12 causes the applicant's device 10 to perform displaying the expense report 80 on the user IF 17, and sending the print job to the printing device.

When printing the expense report 80 using the printing device 40, the approval app 21 causes the applicant's device 10 to print a QR code 86 on the expense report 80. The QR code 86 contains startup information for an approval mini application 31 corresponding to the approval app 21, and the startup information contains access information of a download source of the approval mini application 31. Details of the approval mini application 31 will be described later.

In addition, when the applicant prepares the expense report 80 using the approval app 21, the applicant may download a template of the expense report 80 from the management device 50, and the expense report 80 may be generated by adding or modifying necessary items to the downloaded template of the expense report 80. The approval app 21 may be configured to receive instructions from the applicant and select the printing device 40 to perform printing.

The approval app 21 is a program that provides the applicant with a series of approval procedures (i.e., a signature flow) for the expense report 80. In other words, the approval app 21 cause the applicant's device 10 to perform authenticating the approver, determining the approver's authority, and updating the approver's electronic signature or seal information. The approval app 21 also provides an Optical Character Recognition function (hereinafter referred to as an "OCR function"). The OCR function is a function of extracting characters from image data and generating character information indicating the extracted characters.

The payment app 22 provides so-called electronic payment services to users. That is, the payment app 22 has a function of processing the payment of the amount indicated by the payment instruction in response to receiving the payment instruction.

Figure 4:
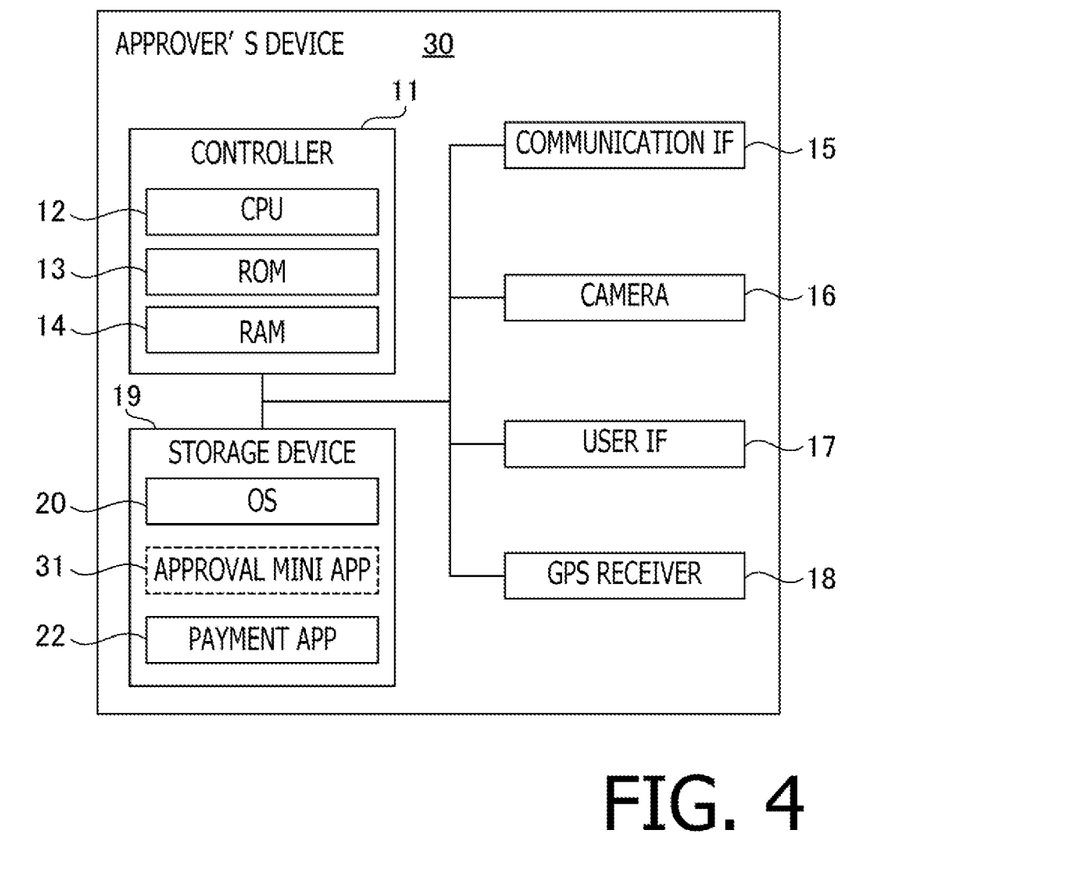
FIG. 4 is a block diagram showing a configuration of an approver's device.

FIG. 4 is a block diagram showing a configuration of the approver's device 30. As shown in FIG. 4, the approver's device 30 has substantially the same configuration as the applicant's device 10. Therefore, components having the same functions as those of the applicant's device 10, the same reference numbers are assigned and the description thereof will be omitted for the sake of simplification.

The major difference between the configuration of the approver's device 30 and the applicant's device 10 is that, in the applicant's device 10, the approval app 21 is installed in the storage device 19, whereas in the approver's device 30, the approval mini application 31 is installed in the storage device 19.

The approval mini application 31 is a mini application that has some of the functions of the approval app 21, and is software for providing users with some of the functions of the approval app 21 in a simplified manner. The "mini application" is an application program that has some of the functions of an application program that must be installed on the device (also referred to as a "full-app"), but does not require installation on the device. Since no installation is required, mini applications can be executed on the device even if installation of programs to the device is restricted. The mini application is a small program compared to the full-app and can be downloaded in a short period of time. After downloaded, mini applications are automatically erased by the OS, for example, when a particular amount of time has elapsed. Therefore, the mini applications have a small memory load. The information entered into the mini applications is also highly secure, as the information does not remain in the memory when the mini applications are erased. The users will be able to use some of the functions of the full-app without having to download and install the full-app by downloading mini applications in situations where they are needed.

As examples of mini applications, AppClip (a program that runs on iOS) by Apple (registered trademark) and InstantApps (a program that runs on Android) by Google (registered trademark) are known. In the present embodiment, the approval app 21 is an example of the full-app, and the approval mini application 31 is an example of the mini application corresponding to the approval app 21. Concretely, the approval mini application 31 according to the present embodiment has functions, among the functions the approval app 21, which is the full-app, of providing a series of approving procedures (i.e., the signature flow) for the expense report 80 to the user and the OCR function.

The approval mini application 31 can be used without being installed in the approver's device 30 as described above. That is, when an approval mini application 31 is downloaded to the storage device 19 of the approver's device 30, the controller 11 can execute the approval mini application 31 in response to the user operation. Therefore, the user can try the approval mini application 31 before installing the full-app, and depending on the results of the trial, the user can decide whether or not to download the approval app 21. When the approval app 21 is installed while the approval mini application 31 is stored, the stored approval mini application 31 is either incorporated into the approval app 21 as it is, or erased and replaced by the approval app 21. In addition, the OS 20 automatically erases the approval mini application 31 from the storage device 19 of the approver's device 30 after a particular amount of time has elapsed since the approval mini application 31 were downloaded.

The approval mini application 31 becomes usable when downloaded, for example, from the external server 70 via the Internet line. It is noted that the approval mini application 31 may be downloaded from the management device 50 instead of the external server 70.

In the present embodiment, by reading the QR code 86 printed on the expense report 80 with a camera 16 and accessing the external server 70 from which approval mini app 31 is to be downloaded based on the access information contained in the startup information, the approval mini application 31 can be downloaded.

The printing device 40 shown in FIG. 1 is an MFP (i.e., a multi-function peripheral) equipped with a print engine and a read engine (not shown), and is connected to the access point 61 of the LAN 60 via a communication interface (not shown).

The external server 70 shown in FIG. 1 is a so-called "xxx store," where software can be downloaded for a fee or free of charge. In the present embodiment, the applicant's device 10 can download the approval app 21 and the approver's device 30 can download the approval mini application 31, respectively. It is noted that the approver's device 30 may be configured to download the approval app 21.

Figure 5:
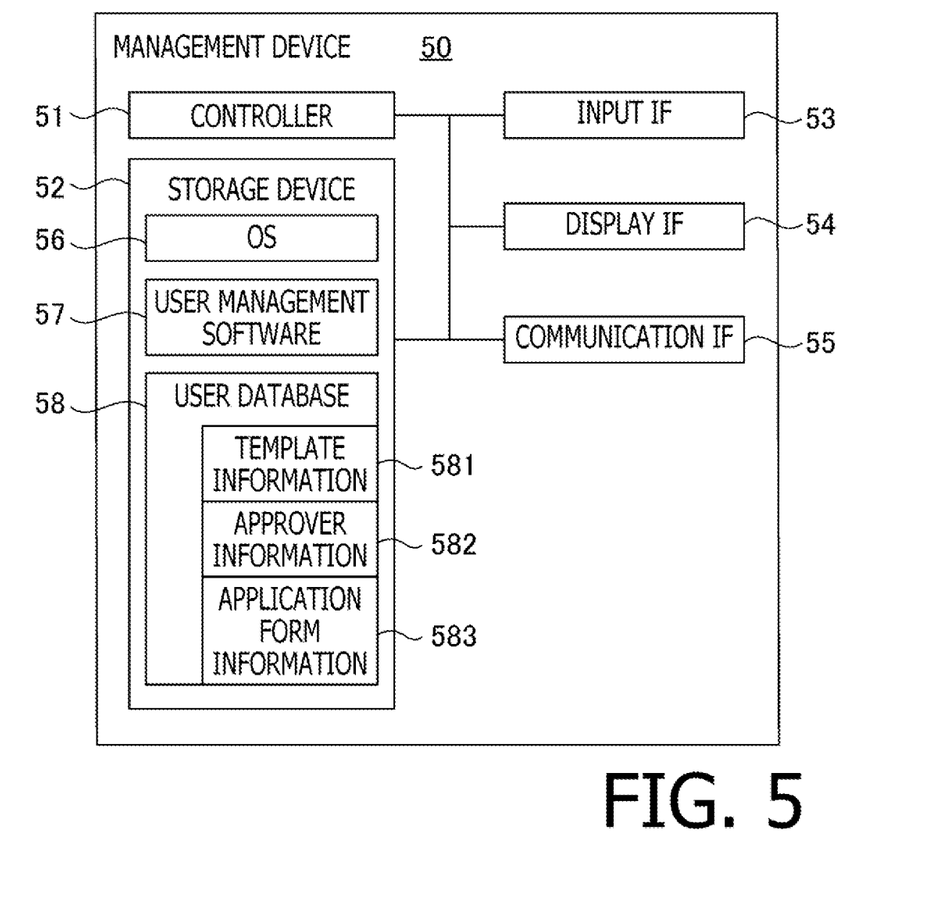
FIG. 5 is a block diagram showing a configuration of a management device.

FIG. 5 is a block diagram showing a schematic configuration of the management device 50. As shown in FIG. 5, the management device 50 has a controller 51, a storage 52, an input IF 53, a display IF 54, and a communication IF 55.

The controller 51 includes a CPU. The storage 52 includes, for example, a ROM, a RAM, an NVRAM, an HDD, and/or an SSD. In other words, the management device 50 has a microcomputer provided with the CPU and a semiconductor memory.

The controller 51 realizes various functions by executing programs stored in the storage 52. The various functions realized by the controller 51 are not limited to those realized by executing a program (i.e., by software processing), but may be realized in part or in whole using one or more hardware.

Various software and data are stored in the storage 52. In the present embodiment, the storage 52 stores, as software, an OS 56, a user management software 57. As the computer system including the controller 51 executes the OS 56 and the user management software 57, various functions are realized.

According to the present embodiment, a user database 58 is also stored in the storage 52. In the user database 58, template information 581 which is template data of the expense report 80, approver information 582 related to the applicant of the expense report 80, application form information 583 storing expense reports 80 applied for by respective applicants. The approver information 582 can be retrieved based on organization information to which the applicant belongs. Further, the approver information 582 includes electronic certification information of the approver. Further, based on the statement number indicated in the number field 81 of the expense report 80, the controller 51 searches the application form information 583 for the expense report 80 stored in the application form information 583. The user database 58 is managed by the user management software 57 and is referenced, updated, added, and the like.

Figure 6:
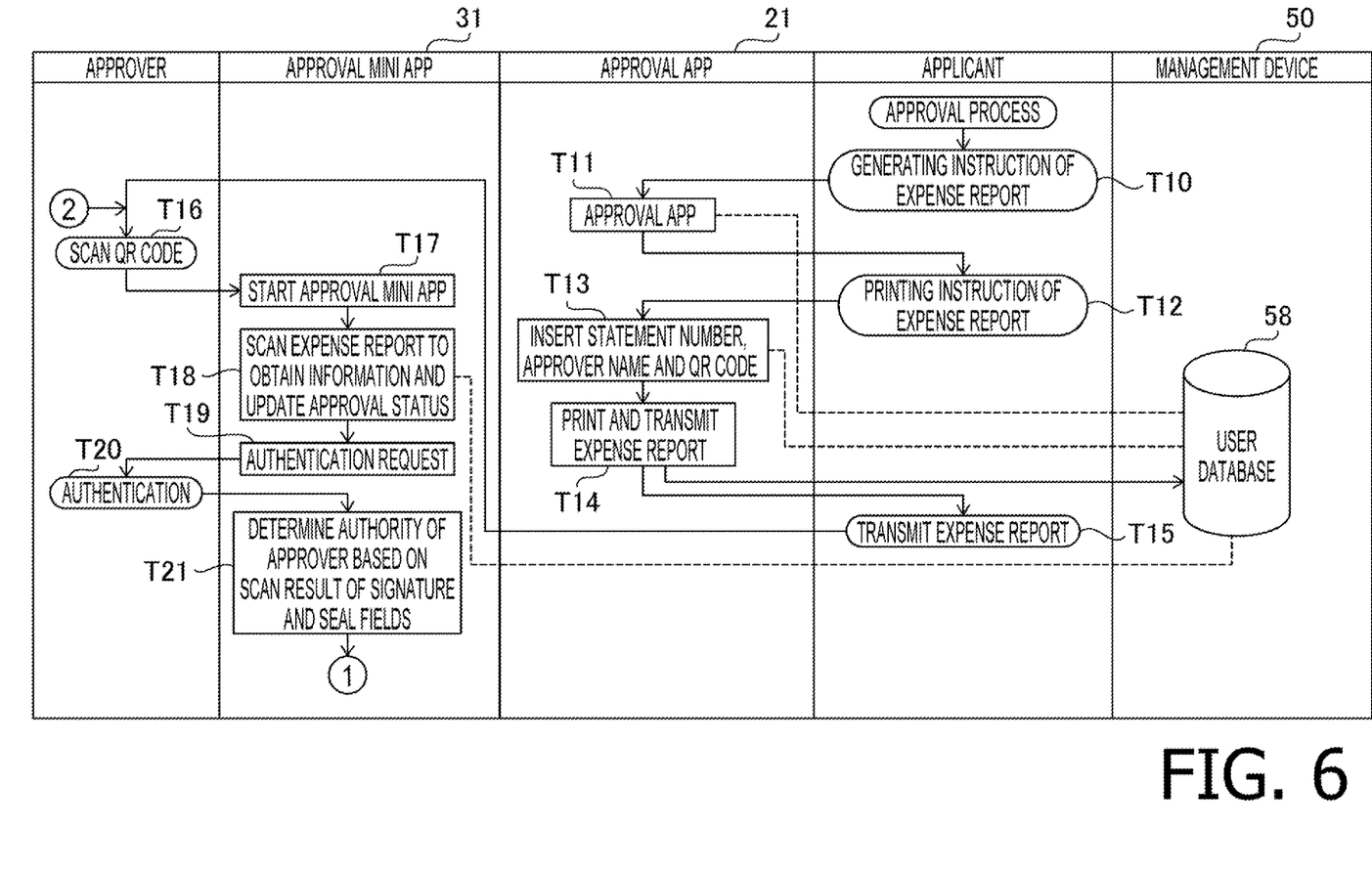
FIGS. 6 and 7 show a sequence diagram illustrating an approving process.
Figure 7:
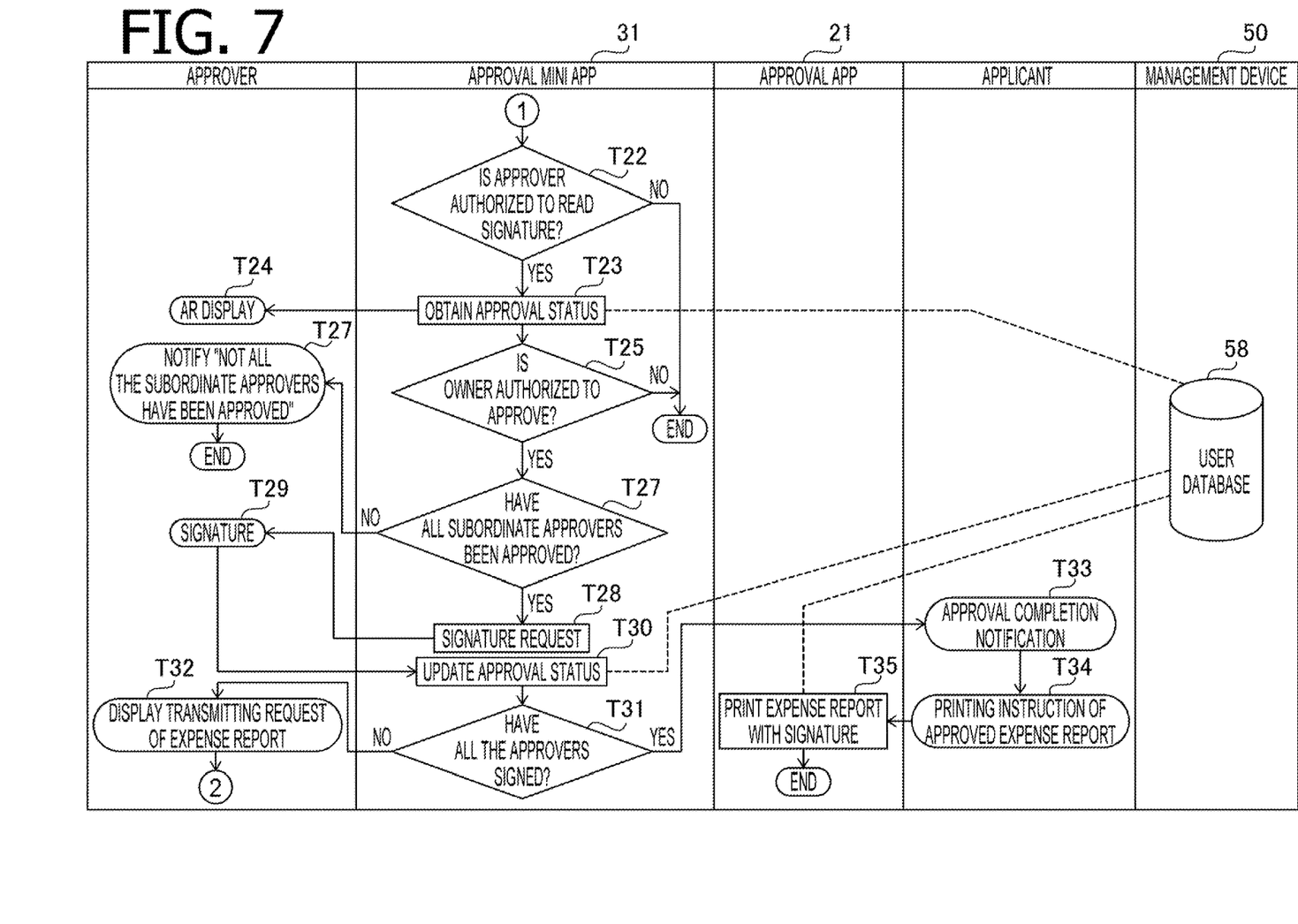

Next, referring to a sequential chart shown in FIGS. 6 and 7, and showing a procedure of an approving process (i.e., the signature flow) executed in the applicant's device 10 and the approver's device 30 of the signature system 1 will be described. The approval process is performed when the CPU 12 of the applicant's device 10 executes the approval app 21, or when the CPU 12 of the approver's device 30 executes the approval mini application 31. In the following description, the operation of each program is described without mentioning the OS 20. In other words, in the following description, a statement to the effect that "Program B controls hardware C" may refer to "Program B controls hardware C using the API of the OS 41." The process of the CPU 12 according to the instructions defined in the program may be described in abbreviated phrases. For example, it may be described as "performed by the CPU" or "performed by the program".

First, in FIG. 6, after launching the approval app 21 on the applicant's device 10, when the applicant taps the user IF 17 on the applicant's device 10 to instruct generating of an expense report 80 (hereinafter referred to as "T10"), the approval app 21 accesses the management device 50, downloads the template information 581, which is the data of the template of expense report 80 stored in the user database 58, and stores the downloaded the template information 581 in the storage device 19 or the RAM 14.

If the approval app 21 is not installed on the applicant's device 10, the applicant can download the same from the external server 70 via the Internet 62. It is noted that the approval app 21 may be downloaded from the management device 50.

The approval app 21 then displays the downloaded template of the expense report 80 on the user IF 17 of the applicant's device 10 and receives the applicant's editing work (T11). Thus, the applicant can fill, in the applicant information field 82, the department information field 83 and the expense statement field 84 of the expense report 80 via the user IF 17. The applicant also performs the electronic approval process on the applicant signature field 851 of the expense report 80.

Next, when the applicant instructs printing of the expense report 80 of which editing has been completed by tapping the user IF 17 of the applicant's device 10 (T12), the approval app 21 accesses the management device 50, downloads the statement number, information regarding the applicant and the approver, and the QR code 86 from the management device 50, and stored the downloaded statement number and information in the storage device 19 or the RAM 14. It is noted that the process of T12 is an example of a reception process.

Thereafter, the approval app 21 inserts the downloaded statement number in the number field 81 of the expense report 80 edited by the applicant. Further, the approval app 21 inserts the downloaded information on the applicant and the approver (concretely, a name of the applicant and a name of the approver) in the signature and seal field 85 of the expense report 80 edited by the applicant. Furthermore, the approval app 21 inserts the downloaded QR code 86 on the right-hand side, in FIG. 2, with respect to the signature and seal field 85 of the expense report 80 edited by the applicant.

In the present embodiment, the statement number is a serial number for managing the expense reports 80, and therefore, the management device 50 issues a new statement number based on the statement number of the application form information 583 which has already been issued and registered in the user database 58. The management device 50 searches the approver information 582 stored in the user database 58 based on the approver information field 82 and the department information field 83 of the expense report 80 to extract information of the of approver necessary for approving the expense report 80. In addition, the management device 50 is capable of extracting the expense report 80 corresponding to the statement number by searching the user database 58 based on the statement number having been issued.

Next, the approval app 21 transmits the print data of the expense report 80 which is edited by the applicant, and the statement number is indicated in the number field 81, information on the applicant and the approver is indicated in the signature and seal field 85, and the QR code is indicated thereon to the printing device 40. Then, the printing device 40 prints the expense report 80 on the printing device 40 based on the received print data. The approval app 21 transmits information of the expense report 80 which is edited by the applicant, and contains the statement number in the number field 81 and the applicant and approver information in the signature and seal field 85 to the management device 50. Therefore, the management device 50 stores the received expense report 80 in the user database 58 as the application form information 583 with the statement number as the index (T14). It is noted that the process in T14 is an example of the printing process and an uploading process, and the statement form information is an example of electronic data.

As described above, according to the present embodiment, since the expense report 80 on which the statement number is indicated in the number field 81, the application and the approver information is indicated in the signature and seal field 85 is indicated thereon, it becomes easy to bring about the printed mattes, and occurrence of a problem such as loss of some printer materials can be avoided.

In the present embodiment, it is configured that the signature and seal field 85 and the QR code 86 are printed together with the expense report 80. However, the configuration is not necessarily limited to the above. For example, the signature and seal field 85 and the QR code 86 may be printed as a label by a label printer, separated from the expense report 80, and the applicant may adhere the printed label to the expense report 80. Alternatively, only the QR code 86 may be printed as a label by the label printer, separated from the expense report 80, and the applicant may adhere the printed label to the expense report 80.

By configuring the system in this way, it becomes unnecessary for the approval app 21 to insert the names of the applicant and the approver or the QR code 86 into the expense report 80, and the load to edit the expense report 80 can be reduced.

Next, the applicant transmits the paper expense report 80 printed by the printing device 40 to the primary approver (T15). At this time, the applicant may bring the printed paper expense report 80 to the primary approver or transmit the same to the primary approver, by e-mail, as an attachment.

The primary approver who has received the paper expense report 80 may then scan the QR code 86 on the expense report 80 with the camera 16 of the approver's device 30 (T16), read the URL of the approval mini application 31 and download the approval mini application 31 from the external server 70. After the approval mini application 31 is downloaded from the external server 70 via the Internet line, the approval mini application 31 is started on the approver's device 30 (T17).

Next, the approval mini application 31 displays a request to scan the entire expense report 80 on the user IF 17. Upon seeing the request, the primary approver scans the entire expense report 80 with the camera 16 of the approver's device 30, and the approval mini application 31 obtains, using the OCR function of the approver's device 30, the statement number indicated in the number field 81 and the applicant and approver information indicated in the signature and seal field 85 of the expense report 80 and identifies the same. When the approval mini application 31 detects the seal imprint which is sealed by the approver in the signature and seal field 85, the approval mini application 31 accesses the management device 50 to update the approval status (T18). However, at the stage of the first approver, there is no seal imprint sealed by the approver in the signature and seal field 85, so the approval mini application 31 does not update the approval status. It is noted that the procedure in T18 is an example of the document identifying process and the signer identifying process.

According to the present embodiment, the entire expense report 80 and the QR code 86 are scanned with the camera 16 of the approver's device 30. However, the configuration is not necessarily limited to such a configuration. For example, the entire expense report 80 may be scanned using a scanner of the printing device 40 and the approver's device 30 may be configured to obtain the scanned result from the printing device 40 via the LAN 60.

Although the present embodiment is configured to scan the entire expense report 80 to obtain the information of the applicant and approver indicated in the signature and seal field 85, the configuration is not necessarily limited to such a configuration. For example, the approval mini application 31 may be configured to access the management device 50 to obtain the information of the applicant and the approver indicated in the signature and seal field 85. The applicant and approver information may be embedded in the QR code 86, and at T16, when the QR code 86 is scanned by the camera 16 of the approver's device 30, the approval mini application 31 may obtain the information of the applicant and the approver indicated in the signature and seal field 85.

Next, the approval mini application 31 displays, on the user IF 17, an authentication request for identifying the primary approver, i.e., the owner of the approver's device 30 (T19).

Next, the approval mini application 31 confirms the identity of the approver using biometric authentication information stored in the approver's device 30, ID and password, and user information registered in other applications such as Wallet (T20). The approval mini application 31 may also be configured to verify the identity of the approver by scanning a particular ID card in accordance with Near Field Communication (NFC) or by other means.

Next, the approval mini application 31 determines the authority of the approver, i.e., the owner of the approver's device 30, based on the results of the identity verification of the approver in T20 and the information on the applicant and the approver obtained at T18 to determine the authority of the approver who is the owner of the approver's device 30 (T21).

In the present embodiment, the applicant and approver listed in the signature and seal field 85 are considered as those authorized to display the electronic signature, but the configuration is not necessarily limited to such a configuration. For example, it is acceptable to include the department accountant or department administrator as authorized to display the electronic signature. In such a case, it is necessary for the approval mini application 31 to access the management device 50 at T18 to obtain the information of the department accountant or department administrator. In such a case, persons related to the expense report 80 can overlay the information indicating the signature status in T24, which is described later, and the approval procedure can be performed smoothly.

Next, the approval mini application 31 determines whether the approver of the approver's device 30 (i.e., the logged-in user of the approver's device 30) is authorized to read the digital signature (T22). If the results of the identity verification at T20 do not match the applicant and approver information obtained at T18, and the approval mini application 31 determines that the approver, who is the owner of the approver's device 30, is not authorized to display the digital signature (T22: NO), this process is terminated. At this time, the user IF 17 on the approver's device (approver's device) 30 may notify the approver by displaying the message "You are not authorized to display digital signatures." It is noted that such a notification may be made by other notification methods, such as voice, or the like.

Thus, in this embodiment, when the approver who is the owner of the approver's device (approver's device) 30 is not authorized to display the electronic signature, this process is terminated, the approval status information obtained from the management device 50 will not be disclosed to a third party, thus the security of the approval process being ensured.

On the other hand, if the results of the identity verification at T20 match the applicant and approver information obtained at T18, and the approval mini application 31 determines that the approver, who is the owner of the approver's device 30, is authorized to read the digital signature (T22: YES), the approval mini application 31 accesses the management device 50 to obtain the approval status information from the application form information 583 stored in the user database 58 of the management device 50 (T23). Next, the approval mini application 31 displays a message, on the user IF 17 of the approver's device 30, to prompt the approver to take a picture of the signature and seal field 85 of the expense report 80 using the camera 16.

Figure 8:
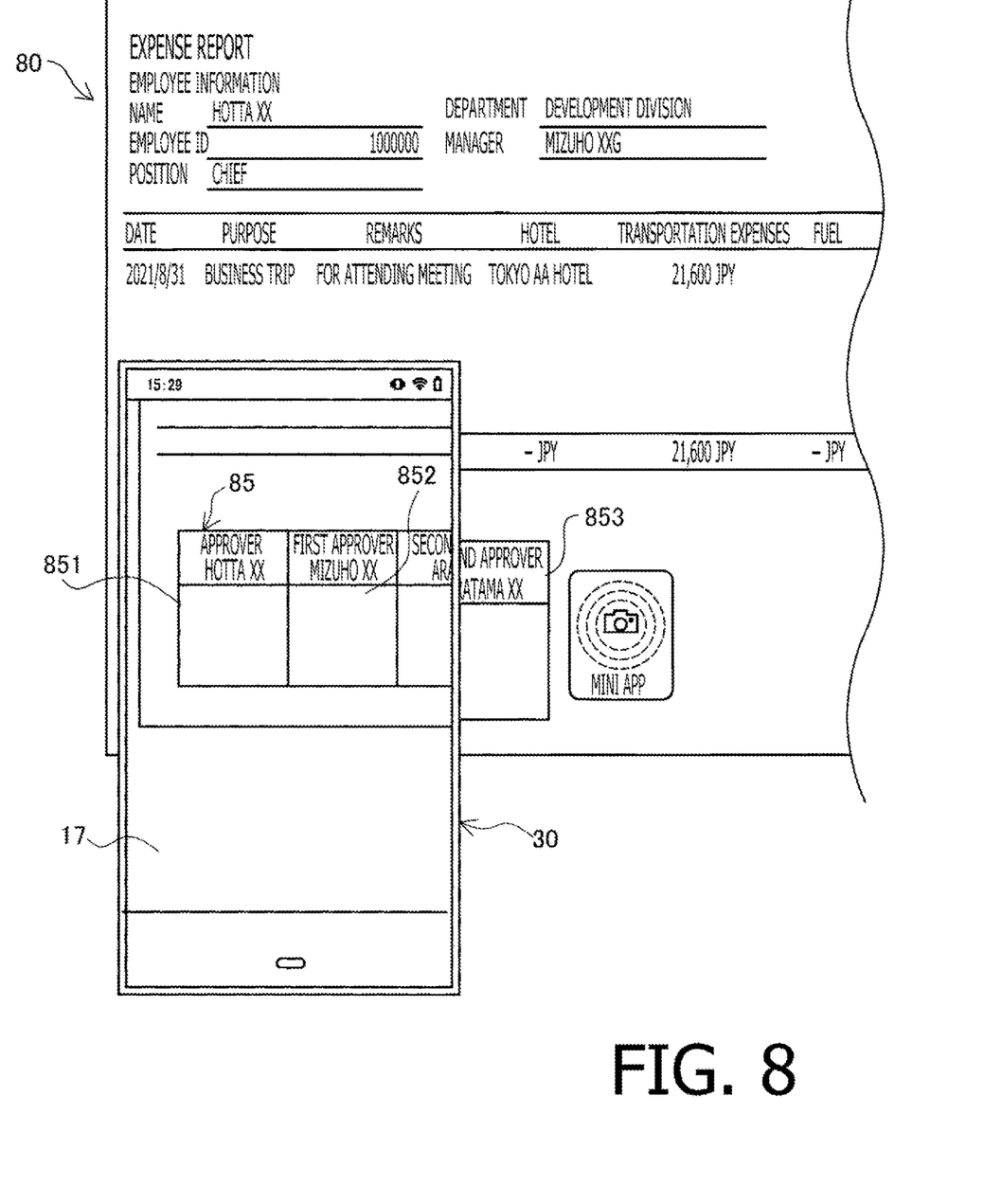
FIG. 8 shows a situation in which signature and a seal field of an expense report are captured using a camera of the approver's device and the captured image is displayed in AR.

When the approver takes a picture of the signature and seal field 85 of the expense report 80 using the camera 16 of the approver's device 30 according to the displayed message, the approval mini application 31 displays information indicating the status of the signature on a photographed picture in an overlaid manner using the AR (T24). It is noted that the process at T24 is an example of a displaying process.

Thus, in the present embodiment, since the signature status of the expense report 80 is displayed, the owner of the approver's device 30 can easily grasp whether his/her own approval is required or not. Further, it is easy to keep track of the current approval progress.

Next, the approval mini application 31 determines whether the owner, who is confirmed as the owner at T20, of the approver's device 30 is authorized to approve (T25). When it is determined that the owner, who is confirmed as the owner at T20, of the approver's device 30 does not match the approver indicated in the signature and seal field 85, and when the owner has been determined to be authorized based on the approval status information obtained in T23, the approval mini application 31 determines that the owner is not authorized (T25: NO), and terminates the current process. In this case, the approval mini app 31 may notify the approver by displaying a message on the user IF 17 of the approver's device 30 that the approver is "not authorized." This notification may be made by other notification methods such as using voice or the like. The process in T25 is an example of a determining process.

When the owner of the approver's device 30 that the owner has been confirmed in T20 matches the approver listed in the signature and seal field 85, and the approval status is determined to be unapproved based on the approval status information obtained in T23, the approval mini application 31 determines that the approver has approval authority (T25: YES).

Next, the approval mini application 31 determines whether all subordinate approvers have approved (T26). This determination is based on the approval status information obtained by mini application 31 from the management device 50 at T23. If the approval mini application 31 determines that not all subordinate approvers have approved (T26: NO), then approval mini application 31 displays a notice on the user IF 17 of the approver's device 30, stating that "not all subordinate approvers have been approved" (T27) to notify the approver (himself/herself) of this fact (T27), and then terminates this process. This notification may be made by other notification methods, such as voice, or the like. It is noted that the process at T27 is an example of a notifying process.

Thus, in the present embodiment, if there is an approver who should sign before the approver who is the owner of the approver's device 30, the approver who is the owner of the approver's device 30 cannot make a signature, thus ensuring the reliability of the approval process.

On the other hand, if the approval mini application 31 determines that all subordinate approvers have already approved (T26: YES), then the approval mini application 31 displays a "message requesting approval" on the user IF 17 of the approver's device 30 (T28). The process in T28 is an example of the signature requesting process.

The approver who sees the "message requesting approval" displayed on the user IF 17 of the approver's device 30 applies a process of an electronic signature on a signature and seal filed 852 for the primary approver in the signature and seal field 85 (T29) after displaying the expense report 80 on the user IF 17 of the approver's device 30.

Next, the approval mini application 31 accesses the management device 50 and updates the current approval status (T30). Thus, the management device 50 updates the application form information 583 stored in the user database 58. It is noted that the process at T30 is an example of an updating process.

Next, the approval mini application 31 determines whether all the approvers have signed (T31). In this example, the signature of the secondary approver has not been performed, the approval mini application 31 determines that all the approvers have not signed (T31: NO), and proceeds to T32. In T32, the approval mini application 31 displays a "message requesting to transmit the expense report 80 to the secondary approver" on the user IF 17 of the approver's device 30. The primary approver who watches this message transmits the paper expense report 80 to the secondary approver. At this time, the primary approver may bring the printed paper expense report 80 to the secondary approver, or transmit an e-mail attaching the expense report 80 to the secondary approver.

Thus, in the present embodiment, the approval mini application 31 performs the processes T18-T30, thereby completing the approval process of the primary process. According to the present embodiment, when all the approvers have not signed, a guidance message is displayed, and thus the approval process can be performed smoothly.

The secondary approver who receives the paper expense report 80 from the primary approver scans the QR code indicated on the received expense report 80 with the camera 16 of the approver's device 30 of the secondary approver (T16). Then, the approval mini application 31 is started on the approver's device 30 of the secondary approver (T17). Thereafter, the approval mini application 31 performs the processes T18-T30 similarly to a case of the primary approver, the approval process of the secondary approver is completed.

Then, the approval mini application 31 determines that all the approvers have signed (T31: YES), and notifies the approval has been completed, by push notification, to the user IF 17 of the applicant's device 10 (T33). This notification may be made by other notification methods, such as voice, or the like. The procedure in T33 is an example of the notification process.

Thus, in the present embodiment, the approver's device 30 notifies the applicant's device 10 of the completion of the process. Therefore, the applicant can immediately know that all signatures have been made, thereby improving convenience.

The applicant who watches the push notification instructs printing of the approved expense report 80 by tapping the user IF 17 of the applicant's device 10 (T34). Then, the approval app 21 accesses the management device 50, obtains the expense report 80 for which all the signatures have been made from the user database 58 of the management device 50 and transmits the same to the printing device 40 as the print data (T35), and terminates the process. It is noted the process at T35 is an example of a printing process.

The printing device 40 then prints the approved expense report 80 based on the received print data. Thus, the applicant can obtain a printout of the expense report 80 for which the signatures have been made.

As described above, in the present embodiment, the primary and secondary approvers proceed with the approval procedure by means of electronic signatures. Next, a case where the secondary approver sings on behalf of the primary approver after the primary approver performs the approval procedure by applying a seal on the signature and seal field 852 for the primary approver of the signature and seal filed 85 of the paper expense report 80. In the following description, if the approval mini application 31 performs the same process, in the processes T18-T35, as described above, the description thereof will be omitted.

In this example, the primary approver who has received the paper expense report 80, applies the seal on the signature and seal field 852 for the primary approver of the paper expense report 80 without scanning the QR code 86 indicated on the expense report 80 with the camera 16 of the approver's device 30. Thereafter, the primary approver transmits the paper expense report 80 on which the seal has been applied to the secondary approver. It is noted that the applicant may bring the printed paper expense report 80 to the secondary approver or send the expense report 80 as an email attachment to the secondary approver.

The secondary approver who has received the paper expense report 80 then scans the QR code indicated on the expense report 80 with the camera 16 of the approver's device 30 (T16). Then, the approval mini application 31 is started on the approver's device 30 (T17).

Next, when the approval mini application 31 detects, at T18, an imprint of the primary approver's seal at the signature and the seal field 852 for the primary approver of the signature and seal field 85, the approval mini application 31 accesses the management device 50 and updates the approval status. Therefore, the management device 50 updates the application form information stored in the user database 58.

Next, the approval mini application 31 determines that all the subordinate approvers have approved (T26: YES) since the approval status has been updated in T18.

Next, in T28, the approval mini application 31 displays a "message requesting approval" on the user IF 17 of the approver's device 30. Then, the secondary approver who sees the "message requesting approval" displayed on the user IF 17 of the approver's device 30 displays the expense report 80 on the user IF 17 of the approver's device 30 and then performs the electronic signature on the signature and seal field 853 for the secondary approver of the signature and seal field 85 of the displayed expense report 80. When recognized that a seal of the first approver is indicated on the signature and seal field 852 for the first approver on the expense report 80, the secondary approver performs the electronic signature on behalf of the first approver on the signature and seal field 852 for the first approver.

Next, at T30, the approval mini application 31 accesses the management device 50 and updates the approval status including the signature on behalf of the first approver. Therefore, the management device 50 updates the application form information 583 stored in the user database 58.

Next, at T35, the approval app 21 obtains the data of the approved expense report 80 including the signature on behalf of the primary approver from the user database 58 of the management device 50, and transmits the same, as the print data, to the printing device 40.

Thus, according to the present embodiment, even if the primary approver, who is a subordinate approver, seals on the paper expense report 80, the secondary approver, who is a superior approver, can make a signature on behalf of the primary approver. Therefore, even if intermediate approvers cannot make electronic signatures and seals on the paper expense report 80, a flow of the approval process (i.e., the signature flow) in the signature system 1 can be completed by making the electronic signatures.

As described in detail, according to the present embodiment, signatures can be made by the approval mini application 31 which is unnecessary to be installed in the approver's device 30. Therefore, even if the approval app 21, which is the full-app, is not installed, or installation of the approval app 21 is restricted to usage authorization of the approver's device 30, the signature can be made.

The above described embodiments are merely illustrative and do not limit aspects of the present disclosures in any way. Therefore, aspects of the present disclosures can naturally be improved and/or modified in various ways within the scope that does not depart from aspects of the present disclosures. For example, the number of each of the applicant's device 10, the printing device 4, and the management device 50 that constitute the signature system of the present embodiment is not necessarily limited to one, but may be multiple.

In the above-described embodiments, the approvers include two, the primary approver and the secondary approver. However, the number of approvers may be three or more. In such a case, the number of the approver's device 30 may be the same as the number of the approvers.

In the above-described embodiments, the approval mini application 31 is configured such that, when it is determined that all the approvers have approved (T31: YES), the completion of the approval is notified by the push notification (T33) on the user IF 17 of the applicant's device 10. The configuration is not necessarily limited to the above. For example, when the approval mini application 31 accesses the management device 50 to update the current approval status (T30), the management device 50 determines whether all approvers have been approved or not, and if all approvers have been approved, the management device 50 may be configured to transmit the push notification to the user IF 17 of the applicant's device 10 to notify that the approval has been complete.

In the present embodiment, the QR code 86 is used as the mark containing the startup information for the approval mini application 31, but other symbols, such as a two-dimensional bar code, may also be used.

In the present embodiment, when the startup information of the approval mini application 31 is obtained, the approval mini application 31 is downloaded and started. However, if the approval app 21 is already installed on the approver's device 30, the approval mini application 31 is not downloaded, but the approval app 21 is started. Since the approval app 21 includes the functions of the approval mini application 31, the approval app 21 can execute all the approver side processes instead of the approval mini application 31.

In addition, in any processing procedure disclosed in the above-described embodiments, any of arbitrary processes in any number of steps can be arbitrarily changed in the order of execution or executed in parallel to the extent that there is no inconsistency in the processing content.

The processing steps disclosed in the embodiment may be performed by a single CPU, multiple CPUs, ASICs or other hardware, or a combination thereof. The processing procedures disclosed in the embodiment may also be realized in various forms, such as a non-transitory computer-readable recording medium containing a program for executing the processing, or a method.

What is claimed is:

1. A signature system having a first device and a second device, the first device being a device for an applicant, the second device being a device for an approver,
    the first device comprising a first non-transitory computer-readable storage containing first computer-executable instructions realizing a full-application executable by a computer of the first device, the full-application corresponding to a signature flow, and
    the second device not having the full-application installed,
    wherein, when the first device receives a print instruction to print a digital document subject to signature, the full-application cause, when executed by the computer of the first device, a printer to print the digital document, a signature field, and a mark for starting up a mini application, identification information of the digital document being printed on the printed digital document, information of a signer being printed on the printed signature field, the mini application being a program realized by second computer-executable instructions, the mini application being a program having part of functions of the full-application, the mini application being executable after downloaded without installation, the mini application being deleted when a particular time period has elapsed after downloaded, the mark for starting the mini application including access information necessary for download of the mini application,
    wherein the full-application further causes, when executed by the computer of the first device, the first device to upload electronic data corresponding to the digital document to a server to store the digital document therein in response to receipt of the print instruction, the electronic data to be stored in the server containing identification information of the digital document and signature information including a signer of the digital document and a signature status, wherein the second device is configured to read the mark printed by the first device, download the mini application using the access information contained in the mark, and execute the downloaded mini application, wherein the mini application causes, when executed by a computer of the second device, the second device to perform:

identifying a user of the second device;

reading the digital document printed by the first device to identify the identification information of the digital document;

reading the signature field printed by the first device to identify the signer for the digital document;

determining whether approval of the identified user of the second device is necessary based on the identified signer of the digital document and based on the signature information included in the electronic data corresponding to the identified identification information of the digital document among the electronic data stored in the server;

requesting for a signature of the user of the second device when determining that the approval of the identified user of the second device is necessary; and accessing the server when a digital signature of the user of the second device has been made, updating the signature information contained in the electronic data corresponding to the identified identification information of the digital document.

2. A non-transitory computer-readable recording medium containing computer-executable instructions realizing an applicant side program executable by a computer of a first device, the applicant side program corresponding to a signature flow, and wherein the applicant side program causes, when executed by the computer, the first device to perform:

receiving a print instruction to print a digital document subject to signature, causing a printer to perform printing of the digital document, a signature field, and a mark for starting up a mini application when receiving the print instruction, identification information of the digital document being printed on the printed digital document, information of a signer being printed on the printed signature field, the mini application being a program realized by second computer-executable instructions, the mini application being a program having part of functions of the applicant side program, the mini application being executable after downloaded without installation, the mini application being deleted when a particular time period has elapsed after downloaded, the mark for starting the mini application including access information necessary for download of the mini application, the mini application identifying a user of the second device, identifying identification information of the digital document printed by the first device by reading the digital document printed by the first device, and identifying a signer of the digital document by reading the signature field printed by the first device when the mini application is downloaded by the second device based on the access information included in the mark, wherein the applicant side program causes, when executed by the computer of the first device, the first device to upload electronic data corresponding to the digital document to a server to store the digital document therein in response to receipt of the print instruction, the electronic data to be stored in the server containing identification information of the digital document and signature information including a signer of the digital document and a signature status, the mini application determining whether approval of the identified user of the second device is necessary based on the identified signer of the digital document and based on the signature information included in the electronic data corresponding to the identification information of the digital document among the electronic data stored in the server, requesting for a signature of the user of the second device when determining that the approval of the user of the second device is necessary, and accessing the server when a digital signature of the user of the second device has been made, updating the signature information contained in the electronic data corresponding to the identified identification information of the digital document.

3. The non-transitory computer-readable recording medium according to claim 2, wherein, in the printing, the printer prints the digital document, the signature field, and the mark for starting up the mini application on a same sheet.

4. The non-transitory computer-readable recording medium according to claim 2, wherein, in the printing, the printer prints the digital document on an other sheet different from a sheet on which the signature field and the mark for starting up the mini application are printed.

5. The non-transitory computer-readable recording medium according to claim 2, wherein the second device is a device for an approver, the second device comprising a second non-transitory computer-readable storage containing second computer-executable instructions realizing a approver side program, wherein the approver side program causes, when executed by a computer of the second device, the second device to perform notifying the first device of completion of signature of the digital document.

6. The non-transitory computer-readable recording medium according to claim 5, wherein the applicant side program causes, when executed by the computer of the first device, the first device to perform downloading, from the server, the digital document that the signature has been completed and causing the printer to print the downloaded digital document when the completion of signature of the digital document is notified from the second device.

7. A non-transitory computer-readable recording medium containing computer-executable instructions realizing an approver side program executable by a computer of a device, the approver side program realizing part of functions of a full-application, the approver side program being executable after downloaded without installation, the approver side program being deleted when a particular time period has elapsed after downloaded, the full-application being a program corresponding to a signature flow, the full-application being a program different from the approver side program, wherein the approver side program causes, when executed by the computer of the device, the device to perform:

identifying a user of the device;

reading the digital document printed by the full-application to identify identification information of the digital document, when receiving a print instruction to print the digital document subject to signature, the full-application causing a printer to print the digital document, a signature field, and a mark for starting up the approver side program, the identification information of the digital document being printed on the printed digital document, information of a signer being printed on the printed signature field, the full-application uploading electronic data corresponding to the digital document to a server to store therein in response to receipt of the print instruction, the electronic data to be stored in the server containing identification information of the digital document and signature information including a signer of the digital document and a signature status, and wherein the approver side program further causes, when executed by the computer of the device, the device to perform:

reading the signature field printed by the full-application to identify the signer for the digital document, determining whether approval of the identified user of the device is necessary based on the identified signer of the digital document and based on the signature information included in the electronic data corresponding to the identified identification information of the digital document among the electronic data stored in the server;

requesting for a signature of the user of the device when determining that the approval of the identified user of the device is necessary; and accessing the server when a digital signature of the user of the device has been made, updating the signature information contained in the electronic data corresponding to the identified identification information of the digital document.

8. The non-transitory computer-readable recording medium according to claim 7, wherein, when the identified user of the device has not authority to read out the electronic data stored in the server, the approver side program causes, when executed by the computer of the device, the device not to perform determining whether the approval of the identified user of the device is necessary, and requesting for the signature of the user of the device.

9. The non-transitory computer-readable recording medium according to claim 8, wherein, when the identified user of the device has authority to read out the electronic data stored in the server, the approver side program causes, when executed by the computer of the device, the device to display the signature status of the digital document based on the signature information included in the electronic data stored in the server.

10. The non-transitory computer-readable recording medium according to claim 7, wherein, in the determining, when approval of an approver subordinate to the identified user of the device has not approved, the approver side program determines that the approval of the user of the device is not necessary even when there are a plurality of the approvers of the digital document and the approval of the identified user of the device has approved.

11. The non-transitory computer-readable recording medium according to claim 10, wherein the approver side program causes, when executed by the computer of the device, the device to perform notify that the approver subordinate to the identified user has not approved when the approval of the approver subordinate to the identified user of the device has not approved and then the device determines that the approval of the user of the device is not necessary.

12. The non-transitory computer-readable recording medium according to claim 11, wherein the approver side program causes, when executed by the computer of the device, the device to perform, even when the approver subordinate to the identified user has not approved, determining that the approver subordinate to the identified user has approved when there is an imprint of the subordinate approver in reading result of the signature field in the signature information, and wherein, in the updating, the approver side program updates the signature information such that the user of the device has approved and the approver subordinate to the identified user has approved when determining that the approver subordinate to the identified user has approved based on a fact that there is the imprint of the subordinate approver in reading result of the signature field.

* * * * *